United States Patent Office 2,753,317
Patented July 3, 1956

2,753,317

DISPERSIONS AND USE THEREOF

Boynton Graham, Claymont, Del., assignor to E. I. du Pont de Nemours and Company, Wilmington, Del., a corporation of Delaware No Drawing. Application November 22, 1952, Serial No. 322,151

7 Claims. (Cl. 260—29.6)

This invention relates to new aqueous dispersions of acrylonitrile polymers and to the preparation of shaped articles therefrom.

Shaped articles from acrylonitrile polymers are usually fabricated from solutions of the polymers in special organic solvents since the polymers do not easily coalesce or melt. The organic solvents which can be employed are, in general, disadvantageous in view of their high cost, expense of solvent removal, and recovery, and the explosive and toxic hazards involved. It has been proposed by Rein in U. S. 2,140,921 that certain polymers, including acrylonitrile polymers, be dissolved in concentrated aqueous solutions of certain salts, particularly Group I metal halides, thiocyanates and nitrates. These salts are generally cheap and their use would obviate the disadvantages of organic solvents. However, it is impossible to obtain with an aqueous salt solvent, under conditions which avoid degradation of the acrylonitrile polymer, a solution that is both high in polymer content and contains high molecular weight polymer. This is due to the extremely high viscosity developed as the concentration of dissolved high molecular weight polymer increases.

This invention has as an object the provision of a new dispersant for acrylonitrile polymers. A further object is the provision of new acrylonitrile polymer dispersions. Another object is the preparation of acrylonitrile polymer shaped objects. Other objects will appear hereinafter.

These objects are accomplished by dispersing discrete particles having a maximum dimension of not more than 50 microns of an acrylonitrile polymer containing, in combination, major amounts of acrylonitrile in an aqueous solution of an iron halide in which the halogen has an atomic number of 17 to 53 and which halide at room temperature, i. e., 25 C., forms a stable hydrate having a ratio of at least six molecules of water per iron atom, forming this dispersion into shaped articles by any appropriate means, coalescing the polymer particles, preferably by evaporation of water, and removing the salt by extraction. The dispersions of this invention have a weight ratio of salt to polymer of at least 20 to 80 and generally no more than 97 to 3, preferably between 60 to 40 and 90 to 10, and have at least sufficient water to form a hexahydrate of a major amount of the salt.

The following examples in which parts are by weight are illustrative of the invention.

Example I

Two parts of a finely divided polyacrylonitrile powder was ground in a mortar with 13.3 parts of ferric chloride hexahydrate. The mixture coalesced to a plastic yellow mass which could be pressed into translucent, pliable yellow films. When melted on the steam table, the mixture formed a soft, rubbery, translucent, brown gum. After 15 minutes the film could be stretched about 50% before breaking. It was rinsed in water and in hydrochloric acid and finally washed thoroughly in cold running water. The product was a plastic, translucent, pale yellow film which became hard and stiff upon drying.

Example II

To 5.56 parts of a 40% aqueous dispersion of polyacrylonitrile was added a solution of 14.8 parts of ferric chloride hexahydrate in 20.2 parts of water. To the resultant soft agglomerate was added 25 parts of water and the blend was dispersed in a Waring blendor and then ball milled for 16 hours. The product was a smooth fluid yellow dispersion of finely divided polyacrylonitrile in aqueous ferric chloride. The dispersion was spread on a glass plate and dried for 30 minutes on the steam table. The resultant film was stripped and washed first with water, then with hydrochloric acid and finally with water. The product was a clear, pliable, tough film. It could be stretched about 50% while wet, and become hard, stiff, and tough upon drying.

Example III

A dispersion prepared as in Example II was spread under a 10 mil doctor knife and dried for one hour on the steam table. The resultant clear, soft, rubbery, brown film was extracted with water. While still wet, it was then stretched about 50% in two perpendicular directions and finally dried under tension to prevent shrinkage. The product was a smooth clear film about 0.5 mil thick, with a tensile strength of about 12,000 lbs./sq. in., an elongation of about 11%, and a modulus in tension of about 600,000 lbs./sq. in.

Example IV

A film prepared as in Example III was washed with water, stretched about 100% in one direction, and then dried under tension to prevent shrinkage. The clear, tough product was about 0.4 mil thick, had a tensile strength of 39,000 lbs./sq. in., an elongation of 24%, and a modulus in tension of about 1,300,000 lbs./sq. in.

Example V

A blend of one part of finely divided polyacrylonitrile powder, four parts of ferric bromide and five parts of water was ground in a mortar. The resultant paste was spread on glass, baked for 15 minutes at 200° C., and finally rinsed with water, hydrochloric acid, and water. The product was a self-supporting, well coalesced film which was transparent and essentially colorless.

When the above process was repeated with the exception that the ferric bromide was replaced with, in separate trials, ferrous bromide, ferrous iodide, well coalesced films were likewise obtained. These films were transparent and essentially colorless after extraction of the salt.

Example VI

A blend of 0.1 part of finely divided polyacrylonitrile powder with 4.9 parts of ferric chloride hexahydrate and 5 parts of water was ground in a mortar, spread on glass, baked 15 minutes at 200° C., and finally extracted with water, hydrochloric acid, and water. The product was a self-supporting, well coalesced film.

Example VII

A film was prepared as in the preceding example using 2.5 parts of polyacrylonitrile, 2.5 parts of ferric chloride hexahydrate and 5 parts of water. The film was self-supporting, tough, and well coalesced.

Example VIII

A blend of 3.5 parts of finely divided polyacrylonitrile powder, 1.5 parts of ferric chloride hexahydrate and 5 parts of water was ground in a mortar, spread on glass, baked 15 minutes at 200° C., and finally extracted with water and hydrochloric acid. The product was a moderately well coalesced film of polyacrylonitrile.

*Example IX*

A blend of one part of a finely divided powder of a 95.5 copolymer of acrylonitrile with methyl vinyl pyridine, four parts of ferric chloride hexahydrate and five parts of water was ground in a mortar, spread on glass, baked 15 minutes at 200° C., and finally extracted with water and hydrochloric acid. The product was a well coalesced film of the polyacrylonitrile copolymer.

The polymers employed in the process of this invention contain major amounts of acrylonitrile and generally at least 85% of acrylonitrile. They are water insoluble and have a molecular weight of usually at least 10,000. The upper molecular weight is not critical, in fact, a particular advantage of this invention is that extremely high molecular weight polyacrylonitriles can be employed as readily as low molecular weight polymers. This is generally not the case with solution or extrusion techniques.

The salts employed in the preparation of the dispersions of this invention are the halides of iron that form, at room temperature, hexahydrates or higher hydrates, i. e., have at least six molecules of water per atom of iron. The halides are the chlorides, bromides, and iodides, i. e., salts of halogens of atomic number of 17 to 53. Of these, ferric chloride is most readily available and is preferred. The following salts, tested under conditions wherein were useful the iron halides wherein the halogen is of atomic number of 17 to 53, were found not to be operative, in aqueous solution, to form coalescible dispersions: ferric fluoride, ferric nitrate, ferric sulfate, ferric thiocyanate, ferrous chloride, ferrous sulfate, cobaltous fluoride, cobaltous sulfate, nickelous halides (fluoride, chloride, and iodide), aluminum nitrate, lead nitrate, lithium nitrate, manganese nitrate, and potassium nitrate.

The dispersions of this invention are readily prepared by mixing finely divided acrylonitrile polymer with an aqueous solution of the salt in the amounts desired. Although massive polymer is operable in this process, the polymer should have a particle size of less than about 50 microns and preferably less than 15 microns for ease and rapidity of dispersion. Such sizes are obtained by mechanical means, e. g., by the use of micronizers, homogenizers, ball mills, and similar pulverizers if the polymer used is not already in a finely divided state as may be obtained from polymerization. Thus, suspensions of appropriately fine polymer as obtained from emulsion polymerization processes in aqueous media can be employed directly.

The iron halide containing dispersions are prepared at any convenient temperature, preferably one which is not high enough to cause substantial polymer solution or degradation. Temperatures of 0–50° C. can be employed.

The amount of water present in the dispersion must be sufficient to form a hexahydrate of a major proportion, and preferably all, of the iron salt. In the dispersions, water is present in a weight ratio of generally at least one part of water to one part anhydrous salt but can be present in a ratio of the order of 50 or 100 parts water to one part of polymer. Even higher ratios can be used but this involves the evaporation of considerable amounts of water in the coalescing of the acrylonitrile polymer. Inert organic liquids, such as alcohols and ethers in which the iron halides are soluble, can be present in this process and in the resulting dispersion.

The dispersions obtained are readily fluid, especially when polymer concentration is less than about 25% by weight. They are readily employed in the preparation of shaped objects such as films and fibers. The steps involved in the preparation of shaped objects from the polymer dispersion include the shaping of the dispersion in substantially the desired form such as casting on a plate in a thin layer for the preparation of a film or by wiping it into grooves on a wheel or belt or by extrusion through a spinneret for the preparation of a fiber or by molding in compression or injection press, or by extruding through a suitably shaped orifice. Up to this state, the dispersion varies from a soft paste through fluids of decreasing viscosity even to a low viscosity fluid as the amount of salt and water increases. The second step, the coalescence step, in which the dispersion is transformed into a clear, shaped object, is accomplished by the removal of part of the water from the dispersion by evaporation. While room temperatures or lower can be used, it is generally preferred that heat, e. g., temperatures of the order of 70–175° C., be employed in transformation of the fluid dispersion to a transparent, coherent film or fiber since the time required is greatly decreased. This is particularly necessary when a continuous process is employed in the preparation of films and fibers and it is desired that the coalescence step consume a time of the order of a few seconds. With short contact times, the actual temperature achieved is relatively immaterial with respect to the degradation of polymer. The third step, the removal of the salt from the shaped polymer, is readily effected by washing with water, an acid, or any solvent for the salt. The shaped polymer article can be stretched to orient the molecules to effect improvement in physical properties. A preferred manner of orientation is to draw the coalesced polymer/salt/water object, then proceed with washing and drying with the object under tension. Stretching may also be carried out after removal of the salt by washing. It is usually desirable to conduct such stretching while the object is still wet from washing, or, if it has been allowed to dry, after re-wetting.

Among the advantages of the present invention is the advantage that difficulties of fabrication from solutions of high molecular weight polymers, e. g., balling up, high viscosity, and chemical degradation, are avoided since the dispersions are fluid or readily plastic and do not react with the polymers at the temperatures used. Furthermore, the dispersions can be, and preferably are, quite concentrated with respect to the amount of polymer present. An additional advantage of the process of this invention is that isolation of polymer, when it is prepared as an aqueous dispersion, is not required. Furthermore, salt/water systems are cheap and readily available, particularly when ferric chloride is used.

The foregoing detailed description has been given for clearness of understanding only and no unnecessary limitations are to be understood therefrom. The invention is not limited to the exact details shown and described for obvious modifications will occur to those skilled in the art.

What is claimed is:

1. A dispersion of an undissolved acrylonitrile polymer of major acrylonitrile content in an aqueous solution of an iron halide wherein the halogen is of atomic number of 17 to 53 and the iron halide forms a hexahydrate at 25° C., said solution containing at least one part of water to one part of iron halide and from 1.5 to 9 parts of halide per part of polymer.

2. A dispersion of an undissolved acrylonitrile polymer of major acrylonitrile content in an aqueous solution of a ferric halide wherein the halogen is of atomic number of 17 to 53, which halide forms a hexahydrate at 25° C., the ratio of halide to polymer being from 1.5 to 9 parts of halide per part of polymer.

3. A dispersion of an undissolved acrylonitrile polymer of major acrylonitrile content in an aqueous solution of ferric chloride, the ratio of ferric chloride to polymer being from 1.5 to 9 parts of ferric chloride per part of polymer.

4. A process for making shaped objects of an acrylonitrile polymer of major acrylonitrile content from an aqueous dispersion of said polymer characterized by the use, as the fluid dispersion from which the shaped objects are produced, of a dispersion of said acrylonitrile polymer, undissolved, in an aqueous solution of an iron halide wherein the halogen is of atomic number of 17 to 53 and the iron halide forms a hexahydrate at 25° C., said solution containing at least one part of water to one part of metal halide and having a halide to polymer ratio from 20:80 to 97:3.

5. A process for making shaped obejcts wherein a dispersion of an undissolved acrylonitrile polymer of major acrylonitrile content in an aqueous solution of an iron halide wherein the halogen is of atomic number of 17 to 53 and the iron halide forms a hexahydrate at 25° C. is formed into the desired shape, water is removed from the shaped object and the metal halide is therefrom removed.

6. In a process for making shaped objects from an aqueous dispersion of an acrylonitrile polymer wherein the dispersion is formed into the desired shape and water removed therefrom, the improvement wherein the acrylonitrile polymer is dispersed, undissolved, in an aqueous solution of an iron halide which forms a hexahydrate at 25° C. and wherein the halogen is of atomic number of 17 to 53.

7. In a process for making shaped objects from an aqueous dispersion of an acrylonitrile polymer wherein the dispersion is formed into the desired shape and water removed therefrom, the improvement wherein the acrylonitrile polymer is dispersed, undissolved, in an aqueous solution of ferric chloride.

References Cited in the file of this patent

UNITED STATES PATENTS

| | | |
|---|---|---|
| 2,140,921 | Rein | Dec. 20, 1938 |
| 2,648,646 | Stanton et al. | Aug. 11, 1953 |